(12) United States Patent
Emoto et al.

(10) Patent No.: US 8,605,944 B2
(45) Date of Patent: Dec. 10, 2013

(54) IN-TRAIN MONITOR SYSTEM

(75) Inventors: Norishige Emoto, Tokyo (JP); Tatsuo Yamasaki, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 429 days.

(21) Appl. No.: 12/994,233

(22) PCT Filed: Mar. 18, 2009

(86) PCT No.: PCT/JP2009/055290
§ 371 (c)(1),
(2), (4) Date: Nov. 23, 2010

(87) PCT Pub. No.: WO2009/157227
PCT Pub. Date: Dec. 30, 2009

(65) Prior Publication Data
US 2011/0069170 A1    Mar. 24, 2011

(30) Foreign Application Priority Data
Jun. 23, 2008 (JP) ................................. 2008-163748

(51) Int. Cl.
G06K 9/00 (2006.01)

(52) U.S. Cl.
USPC ........................................................ 382/103

(58) Field of Classification Search
None
See application file for complete search history.

(56) References Cited

U.S. PATENT DOCUMENTS

| | | | | |
|---|---|---|---|---|
| 7,224,731 B2* | 5/2007 | Mehrotra | ................. | 375/240.16 |
| 8,139,607 B2* | 3/2012 | Sullivan et al. | ............... | 370/468 |
| 8,155,195 B2* | 4/2012 | Regunathan et al. | ..... | 375/240.16 |
| 2005/0169546 A1* | 8/2005 | Shin et al. | ...................... | 382/239 |
| 2006/0098729 A1 | 5/2006 | Shen | | |
| 2011/0017693 A1* | 1/2011 | Thomas et al. | ............... | 212/270 |

FOREIGN PATENT DOCUMENTS

| | | |
|---|---|---|
| CN | 2796261 Y | 7/2006 |
| CN | 101137055 A | 3/2008 |
| JP | 9-071240 A | 3/1997 |
| JP | 10-174089 A | 6/1998 |
| JP | 10-315970 A | 12/1998 |

(Continued)

OTHER PUBLICATIONS

Chinese Office Action dated Sep. 6, 2012, issued in corresponding Chinese Patent Application No. 200980124670.1 (8 pages).

(Continued)

Primary Examiner — Nancy Bitar
(74) Attorney, Agent, or Firm — Buchanan Ingersoll & Rooney PC

(57) ABSTRACT

Included are: an information management system that manages monitoring-target condition information output from condition-monitoring target devices; cameras that are incorporated in respective train cars and take images of the condition-monitoring target devices; a transmission device that is connected to an in-train transmission channel and transmits imaging data from the camera; a camera-control central device that is connected to the information management system and the transmission device, monitors the monitoring-target condition information sent from the information management system, determines whether the condition-monitoring target devices are in a normal condition, and generates a frame-rate control signal for adjusting a frame rate of imaging data; and a camera-control terminal device that is connected to the transmission device and the camera and adjusts the frame rate of imaging data sent from the camera based on the frame-rate control signal.

8 Claims, 5 Drawing Sheets

(56) References Cited

FOREIGN PATENT DOCUMENTS

| | | |
|---|---|---|
| JP | 2000-251178 A | 9/2000 |
| JP | 2002-127905 A | 5/2002 |
| JP | 2002-209193 A | 7/2002 |
| JP | 2002-367018 A | 12/2002 |
| JP | 2003-137097 A | 5/2003 |
| JP | 2003-346261 A | 12/2003 |
| JP | 3800149 B2 | 7/2006 |
| JP | 2007-318262 A | 12/2007 |
| TW | 200611573 A | 4/2006 |

OTHER PUBLICATIONS

Taiwanese Office Action dated Aug. 30, 2012, issued in corresponding Taiwanese Patent Application No. 10120908610. (9 pages).

International Search Report (PCT/ISA/210) issued on May 26, 2009, by Japanese Patent Office as the International Searching Authority for International Application No. PCT/JP2009/055290.

Written Opinion (PCT/ISA/237) issued on May 26, 2009, by Japanese Patent Office as the International Searching Authority for International Application No. PCT/JP2009/055290.

\* cited by examiner

FIG.5

| CAR NUMBER | MONITORING TARGET | CAMERA NUMBER | IMAGING ANGLE | FRAME RATE | DISPLAY (ON/OFF) |
|---|---|---|---|---|---|
| CAR 1 | AUTOMATIC VENDING MACHINE A | CAMERA 3 | 60° | 5 | |
| | AUTOMATIC VENDING MACHINE B | CAMERA 3 | 70° | 15 | ON |
| | OCEAN-SIDE DOOR | CAMERAS 4 TO 7 | 80° | 2 | |
| | MOUNTAIN-SIDE DOOR | CAMERAS 8 TO 11 | 80° | 15 | |
| | OCEAN-SIDE DOOR | CAMERAS 4 TO 7 | 80° | 15 | |
| | MOUNTAIN-SIDE DOOR | CAMERAS 4 TO 7 | -80° | - | |

IN-TRAIN MONITOR SYSTEM

TECHNICAL FIELD

The present invention relates to an in-train monitor system for monitoring devices installed in a train and conditions of passengers in the train.

BACKGROUND ART

In recent years, an in-train monitor system is incorporated in many trains for providing more comfortable and efficient services and rapid recovery from a failure of a device and the like. This in-train monitor system can collect and monitor certain types of information from devices of train cars, such as doors, air conditioners, and brakes. An in-train monitor system is further capable of taking images of a congestion state inside of a train or operating conditions of amenities, such as washrooms and automatic vending machines, by cameras incorporated in passenger compartments, car coupling portions, doors, car ends and the like. Captured data (hereinafter, simply "imaging data") is sent to a display device provided on a driving cab or in a conductor's compartment over a transmission channel in the train to display the conditions of amenities.

Conventionally, an in-train monitor system disclosed in, for example, Patent Document 1 can display an image of amenities described above on a display device in a case that an anomaly has occurred on the amenities so that the train crew can readily recognize the conditions thereof.

Patent Document 1: Japanese Patent No. 3800149

DISCLOSURE OF INVENTION

Problem to be Solved by the Invention

However, in the in-train monitor system disclosed in Patent Document 1, cameras record a large volume of imaging data and the amount of imaging data sent on an in-train transmission channel increases with a rise in the number of cameras and thus has greater effect on the transmission channel. Particularly when an existing in-train transmission channel is used as data transmitting means, congestion can occur on the transmission channel and the transmission channel can possibly malfunction if adverse conditions occur coincidentally.

The present invention has been made in view of the above, and an object of the present invention is to provide an in-train monitor system that can effectively suppress increase in an amount of data sent on a transmission channel in a train.

Means for Solving Problem

To solve the problem described above and achieve the object, an in-train monitor system includes: an information management system that manages monitoring-target condition information output from various devices incorporated in a train; cameras that are incorporated in respective train cars and take images of the devices incorporated in the train; and a transmission device that is connected to an in-train transmission channel of each train car and relays imaging data from the camera to each train car, wherein the in-train monitor system further includes: a camera-control central device that is connected to the information management system and the transmission device, monitors the monitoring-target condition information sent from the information management system, determines whether the devices incorporated in the train are in a normal condition, and generates a frame-rate control signal for adjusting a frame rate of imaging data from the camera; and a camera-control terminal device that is connected to the transmission device and the camera and adjusts a frame rate of imaging data from the camera based on the frame-rate control signal.

Effect Of The Invention

According to the in-train monitor system of the present invention, increase in the amount of data sent on the in-train transmission channel can be effectively suppressed.

BRIEF DESCRIPTION OF DRAWINGS

FIG. 5 is an example of a camera control table.

BEST MODE(S) FOR CARRYING OUT THE INVENTION

Exemplary embodiments of an in-train monitor system according to the present invention will be explained below in detail with reference to the accompanying drawings. The present invention is not limited to the embodiments.

First Embodiment

Figure 1:
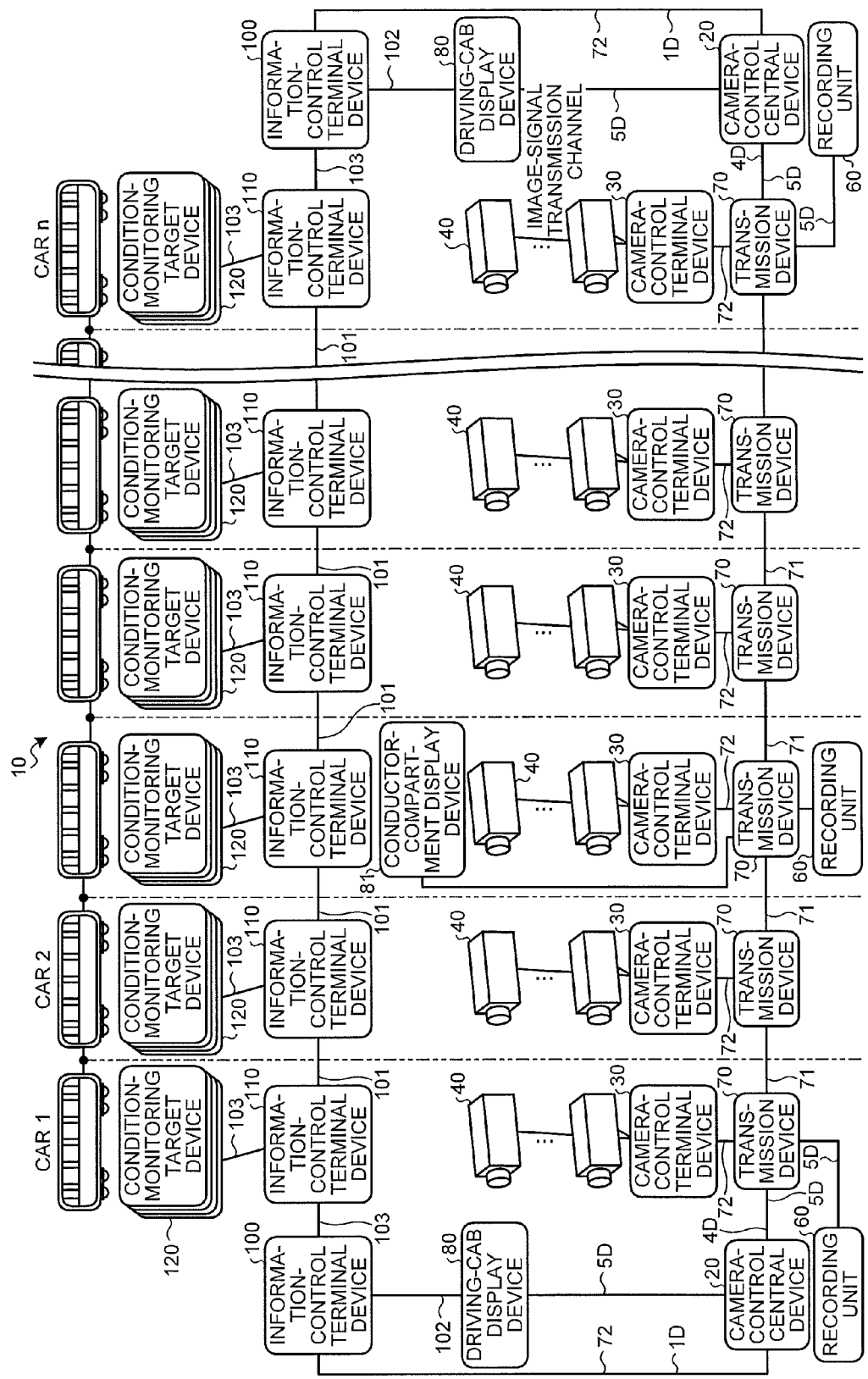
FIG. 1 is a configuration example of an in-train monitor system according to a first embodiment.

FIG. 1 is a configuration example of an in-train monitor system according to a first embodiment of the present invention. An in-train monitor system 10 shown in FIG. 1 is configured to include condition-monitoring target devices 120, information-control terminal devices 110, information-control central devices (hereinafter, simply "central device") 100, driving-cab display devices 80, a conductor-compartment display device 81, camera-control central devices 20, transmission devices 70, recording units 60, camera-control terminal devices (hereinafter, simply "terminal device") 30, and cameras 40 as primary components of the in-train monitor system 10.

The condition-monitoring target devices 120 represent devices incorporated in train cars, such as doors, automatic vending machines, in-car thermometers, and load compensating units. These devices include various types of sensors, and certain monitoring signals sent from the sensors (hereinafter, simply "condition information") 1D can be sent to the information-control terminal device 110.

The information-control terminal device 110 is incorporated in each train car and has two inter-car transmission I/Fs. Therefore, the information-control terminal device 110 incorporated in a train car other than both end cars can be connected to the information-control terminal devices 110 on the adjacent cars through an inter-car transmission channel 101. Because each of the end cars has only one adjacent car, the information-control terminal device 110 incorporated in the end car can be connected to the central device 100 via an intra-car-formation transmission channel 103 using one of the two inter-car transmission I/Fs.

The central device 100 is incorporated in each of the end cars and can be connected to the information-control terminal device 110, the driving-cab display device 80, and the camera-control central device 20. The driving-cab display device 80 is installed in each of the end cars. When a conductor's compartment is included in the train formation, the conductor-compartment display device 81 is installed in the conductor's compartment. A system constructed by the driving-cab display devices 80, the central devices 100, the information-control terminal devices 110, and the condition-monitoring target devices 120 is referred to as information management system.

The driving-cab display device 80 can be connected to the camera-control central device 20. When a train car with a conductor's compartment is included in the train formation, the conductor-compartment display device 81 can be connected to the transmission device 70. Accordingly, the driving-cab display device 80 and the conductor-compartment display device 81 can be used as man-machine I/Fs of the in-train monitor system 10. The driving-cab display device 80 or the conductor-compartment display device 81 receives imaging data (hereinafter, simply "FR (Frame Rate) post-adjustment imaging data") 5D from the cameras 40 which is transmitted from the camera-control central device 20 or the transmission device 70, and the train crew can display any anomalous condition of the condition-monitoring target devices 120 by operating switching keys on a touch-screen panel display. The train crew can accordingly recognize the condition of the condition-monitoring target devices 120. Also, plural pieces of the FR post-adjustment imaging data 5D can be displayed simultaneously by splitting display on the driving-cab display device 80 or the conductor-compartment display device 81.

Although a sensor is required for detecting an abnormal condition of the condition-monitoring target devices 120, it is not necessary to add a new sensor because the condition information 1D handled by a train information management system can be utilized.

For example, by displaying, on the driving-cab display device 80 and the conductor-cab display device 81, an image of passenger exit when the speed of the train has decreased to equal to or less than 5 km/h, the train crew can check whether any passenger has fallen over near a door and the like. The train crew can also ensure that no object is caught in a door when doors are closed. Furthermore, by monitoring the temperature in the train, it can be checked whether passengers are in a hazardous condition with a rise in the train temperature at peak hours.

The camera-control central device 20 is incorporated in each of the end cars. The recording units 60 are incorporated in certain cars, such as the both end cars or a car with the conductor's compartment. The transmission device 70 is incorporated in each car and interconnected with other transmission devices 70 by an inter-car transmission channel 71, thereby forming an information transmission channel in the entire train formation. The terminal device 30 is incorporated in each car and can be connected to the transmission device 70.

The recording unit 60 is connected to the transmission device 70 on the same train car and is capable of recording the FR post-adjustment imaging data 5D. The recorded FR post-adjustment imaging data 5D can be used as evidence material in a case of a criminal act, such as a baggage theft.

Figure 2:
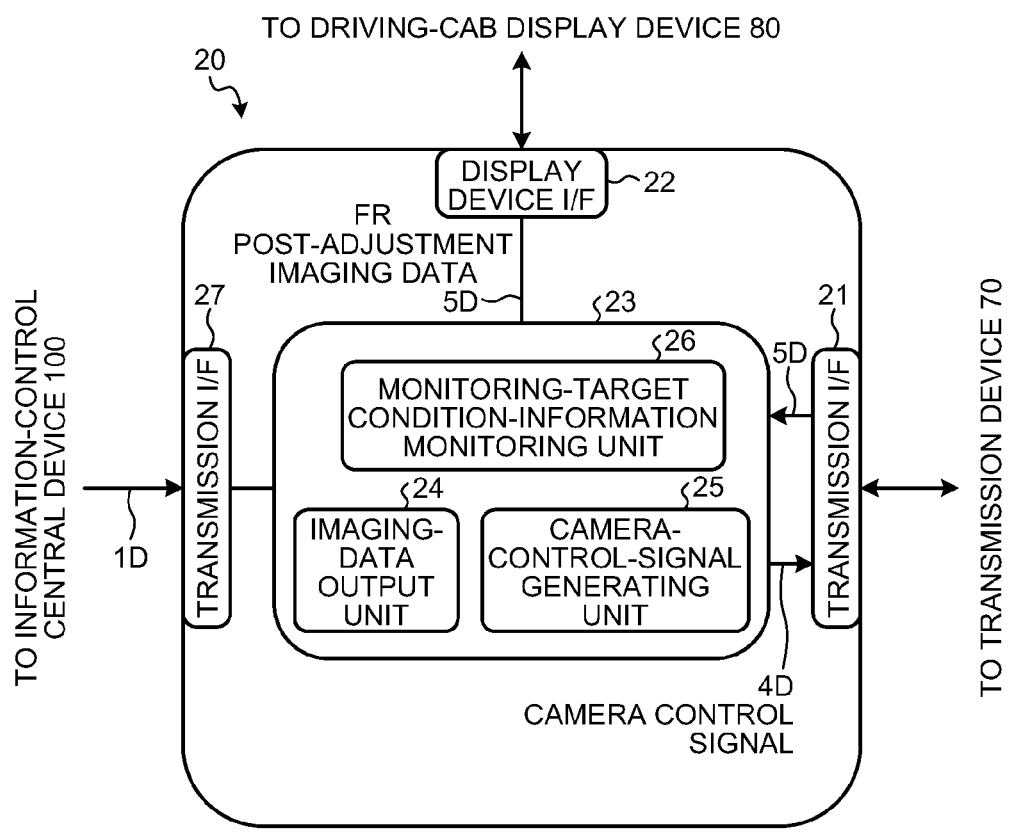
FIG. 2 is a block diagram of a configuration example of a camera-control central device.

FIG. 2 is a block diagram of a configuration example of the camera-control central device. The camera-control central device 20 shown in FIG. 2 is configured to include a transmission I/F 21, a transmission I/F 27, a display device I/F 22, and a signal processor 23 as primary components thereof.

The transmission I/F 21 can connect an intra-car-formation transmission channel 72 that leads to each transmission device 70. The display device I/F 22 can connect a display-device transmission channel 102 that leads to the driving-cab display device 80. The transmission I/F 27 can connect the intra-car-formation transmission channel 72 that leads to the central device 100.

The signal processor 23 is configured to include an imaging-data output unit 24, a camera-control-signal generating unit (hereinafter, simply "signal generating unit") 25, and a monitoring-target condition-information monitoring unit (hereinafter, simply "information monitoring unit") 26. The information monitoring unit 26 can monitor the condition information 1D sent from the central device 100 via the transmission I/F 27 and determine whether any of the condition-monitoring target devices 120 is in an abnormal condition.

The signal generating unit 25 can generate a camera control signal 4D that includes a signal (an FR adjusting signal) for adjusting the frame rate of imaging data before FR adjustment (hereinafter, simply "FR pre-adjustment imaging data") 3D, a control signal 6D for adjusting an imaging direction as well as telephoto/wide-angle setting of the camera 40 (an imaging-direction control signal), information specifying to which the recording unit 60 the FR post-adjustment imaging data 5D is to be recorded, and information designating a destination to which imaging data is sent.

The type of the information is not limited to the above example. For example, an arbitrary recording unit 60 that records the FR post-adjustment imaging data 5D can be designated from plural recording units 60 on board the train. In a case that the recording unit 60 is designated, more than one recording units 60 can be designated or the recording unit 60 can be designated based on the type or volume of the FR post-adjustment imaging data 5D.

The generated camera control signal 4D is sent to each terminal device 30 via the transmission I/F 21 and the transmission device 70 on each train car and utilized in the terminal device 30 for control, such as FR adjustment of the FR pre-adjustment imaging data 3D and angle adjustment of the camera 40.

When the imaging-data output unit 24 has received the FR post-adjustment imaging data 5D via the transmission I/F 21, the imaging-data output unit 24 can send the FR post-adjustment imaging data 5D to the driving-cab display device 80 via the display device I/F 22.

Figure 3:
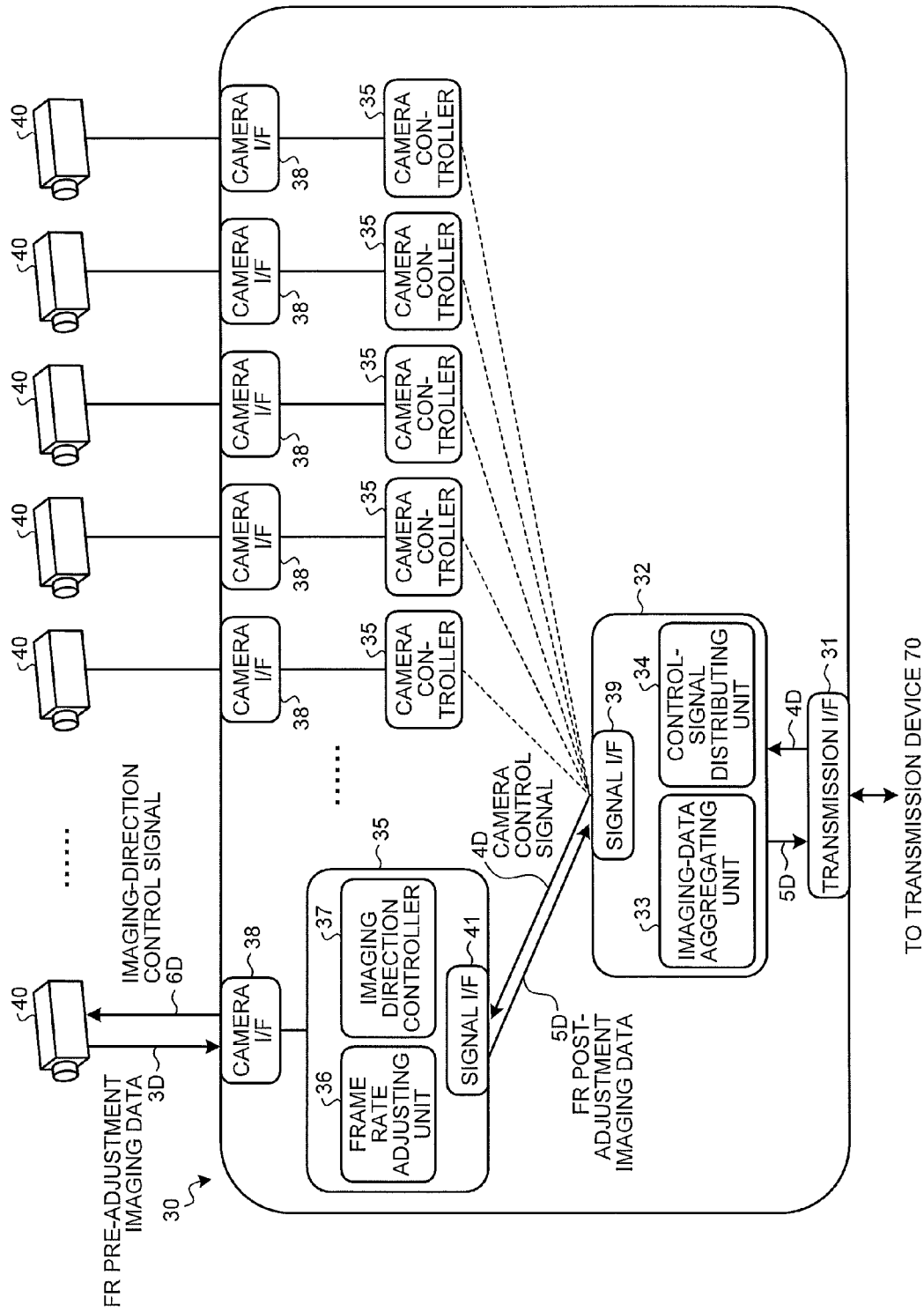
FIG. 3 is a block diagram of a configuration example of a camera-control terminal device.

FIG. 3 is a block diagram of a configuration example of the camera-control terminal device. The terminal device 30 shown in FIG. 3 is configured to include a transmission I/F 31, a signal collecting/delivering unit 32, a camera controller (hereinafter, simply "controller") 35, and a camera I/F 38 as primary components thereof.

The transmission I/F 31 can connect the intra-car-formation transmission channel 72 that leads to the transmission device 70. The camera I/F 38 can connect one or more cameras 40. Although the terminal device 30 shown in FIG. 3 has the camera 40 directly connected to the camera I/F 38, it is also possible to connect a hub to an arbitrary position of the camera I/F 38 and connect the camera 40 via the hub. When such a configuration is employed, limitation on the number of channels for connecting the cameras 40 can be reduced.

The signal collecting/delivering unit 32 is configured to include a signal I/F 39, an imaging-data aggregating unit 33, and a control-signal distributing unit 34. The imaging-data aggregating unit 33 is capable of aggregating the FR post-adjustment imaging data 5D sent from one or more cameras 40 and sending the FR post-adjustment imaging data 5D to the intra-car-formation transmission channel 72. The control-signal distributing unit 34 can receive one or more camera control signals 4D sent from the camera-control central device 20 and sends the camera control signal 4D to one or more controllers 35.

The controller 35 is configured to include a signal I/F 41, an FR adjusting unit (hereinafter, simply "adjusting unit") 36, and an imaging direction controller (hereinafter, simply "direction controller") 37. The signal I/F 41 can receive the camera control signal 4D sent from the signal collecting/delivering unit 32 and send the FR post-adjustment imaging data 5D to the signal I/F 39.

The direction controller 37 can send the imaging-direction control signal 6D included in the camera control signal 4D sent from the control-signal distributing unit 34 to the camera 40 via the camera I/F 38.

Adjustment of the imaging direction and the like of the camera 40 can be made in such a manner that, when an anomaly has occurred on an automatic vending machine located at a deck, for example, the camera 40 which is installed at a position where an image of the vending machine can be taken is adjusted with an angle specified by the signal generating unit 25 as well as telephoto/wide-angle setting corresponding to the angle, so that an image of the vending machine can be automatically taken. Besides, the cameras 40 for taking images of the inside of a crowded train or ocean-side doors or mountain-side doors as viewed from the traveling direction of the train can be similarly controlled.

The adjusting unit 36 can receive the camera control signal 4D sent from the control-signal distributing unit 34 and the FR pre-adjustment imaging data 3D and adjust the FR of the FR pre-adjustment imaging data 3D according to an FR control signal included in the camera control signal 4D.

FR adjustment in the adjusting unit 36 can be made in such a manner that, when the condition-monitoring target devices 120 are in a normal condition, the FR is set to 2 fps as the initial value, and when the speed of the train has decreased to equal to or less than 5 km/h, the FR is changed to 5 fps, for example. Further, adjustment can be performed so that the FR is changed to 15 fps when doors open. These values of the FR are examples and the present invention is not limited thereto.

The FR can be changed according to the congestion degree of the train. For example, when the condition-monitoring target devices 120 are not in an abnormal condition, but the train is crowded and a criminal offense is likely to occur, such as at peak hours, the FR of cameras 40 taking images of the inside of the train can be changed to 5 fps regardless of the train speed. The congestion degree of the train can be determined by converting signals received by the train-information management system from the load compensating units of the respective train cars into a congestion rate.

Further, when the condition-monitoring target device 120 is in an abnormal condition, for example a door that is supposed to be closed is not completely closed, imaging data of higher clarity can be recorded by changing the FR of the camera 40 taking the image of the device in question to a higher rate (15 fps). The FR can be changed according to the kind of anomalous conditions. The FR value can be changed from one camera 40 to another as well.

With these controls, the in-train monitor system 10 can more effectively suppress increase in the amount of data sent on the intra-car-formation transmission channel 72 and other channels than conventional in-train monitor systems, and also can efficiently use the recording capacity of each of the recording units 60.

FIG. 5 is an example of a camera control table. A camera control table 50 is preset in the camera-control central device 20 and used for adjusting FR and the imaging angle of the cameras 40. The camera control table 50 is configured to include a car number 51, a monitoring target 52, a camera number 53, an imaging angle 54, an FR 55, and a display 56.

The car number 51 indicates the number assigned to a train car and is useful for separately adjusting the FR for a train car which can be relatively crowded (the congestion degree is detected by the load compensating units) and that for a less crowded train car, for example.

The monitoring target 52 indicates a code and the like that identifies the name or installing location of the condition-monitoring target device 120. For example, when plural automatic vending machines are installed in the same train car, any condition-monitoring target device 120 on which an anomaly has occurred can be identified by giving different names to the machines.

The camera number 53 indicates the identification number and the like of each of the cameras 40. The in-train monitor system 10 can also take images of plural condition-monitoring target devices 120 with one camera 40. For example, when automatic vending machines A and B are installed close to each other and a "camera 3" is installed at a position where the two machines can be covered by the "camera 3", an image of either one of the machines can be taken only by the "camera 3" by controlling the imaging angle of the "camera 3", even when there is an anomaly with one of the machines. Because it eliminates the necessity to install the cameras 40 as many as the condition-monitoring target devices 120, the amount of the FR post-adjustment imaging data 5D for transmission can be reduced and the amount of data sent on the intra-car-formation transmission channel 72 and the like as well as increase in the amount of data recorded in the recording unit 60 can be effectively suppressed.

The number of the cameras is not limited to the example mentioned above. For example, one camera 40 can be installed near the center of an aisle and plural imaging angles 54 can be set for the camera 40, so that when the condition-monitoring target devices 120 are in a normal condition, an image showing a congestion status in the train is taken by the camera 40, and when an anomalous condition has occurred on any of the condition-monitoring target devices 120, an image of the condition-monitoring target device 120 can be taken by the camera 40.

The imaging angle 54 indicates the imaging angle of each of the cameras 40. The FR 55 indicates the FR of the camera 40 for use at the time of an abnormal condition. The FR values and camera angles are merely examples. For example, an FR can be also specified as appropriate for the type of a device covered by the "camera 3" (for example, automatic vending machines A and B), a period of time when an anomaly is more likely to occur, the frequency of anomalies and the like. An FR for use when there is no anomaly and that for use at the time of an anomaly can be changed from one camera to another.

The display 56 can specify whether or not the FR post-adjustment imaging data 5D is displayed on the driving-cab display device 80 or the conductor-compartment display device 81. With this configuration, when an anomaly has occurred on the condition-monitoring target device 120, the FR post-adjustment imaging data 5D from the camera 40 for which the display 56 is set to "ON" (the "camera 3" for taking the image of an automatic vending machine B in the example of FIG. 5) can be automatically displayed on the driving-cab display device 80 or the conductor-compartment display device 81, for example. This allows the train crew to easily recognize the condition of the condition-monitoring target device 120 on which anomalies frequently occur, for example.

As described above, the in-train monitor system 10 according to the first embodiment includes the signal processor 23 that generates the camera control signal 4D based on the condition information 1D sent from the central device 100, and adjusts the imaging angle and the like of the cameras 40 incorporated in each of train cars according to signals included in the camera control signal 4D. The in-train monitor system 10 also changes the FR of imaging data which is sent from the camera 40, enabling the FR to be switched to a higher FR only when there is an anomaly. In addition, because the FR after switching can be changed as appropriate for the type and condition of the condition-monitoring target device 120 as well as the position where the camera is installed or the like, the minimum imaging data required can be transmitted on transmission channels and recorded in the recording units 60. This can effectively suppress increase in the amount of data transmitted on the intra-car-formation transmission channel 72 and other channels as well as increase in the amount of recorded data in the recording unit 60 as compared to conventional in-train monitor systems. Furthermore, because the rate for imaging data can be changed to a higher rate when an anomaly has occurred on the condition-monitoring target device 120, imaging data can be recorded as a clearer image in the recording unit 60, which can be utilized for security purposes and the like.

Second Embodiment

The in-train monitor system 10 according to a second embodiment is different from the in-train monitor system 10 according to the first embodiment in that a controller 42 which is included in the terminal device 30 according to the first embodiment is incorporated into the camera 40. The configuration of the in-train monitor system 10 is identical to that of the first embodiment and thus descriptions thereof will be omitted.

Figure 4:
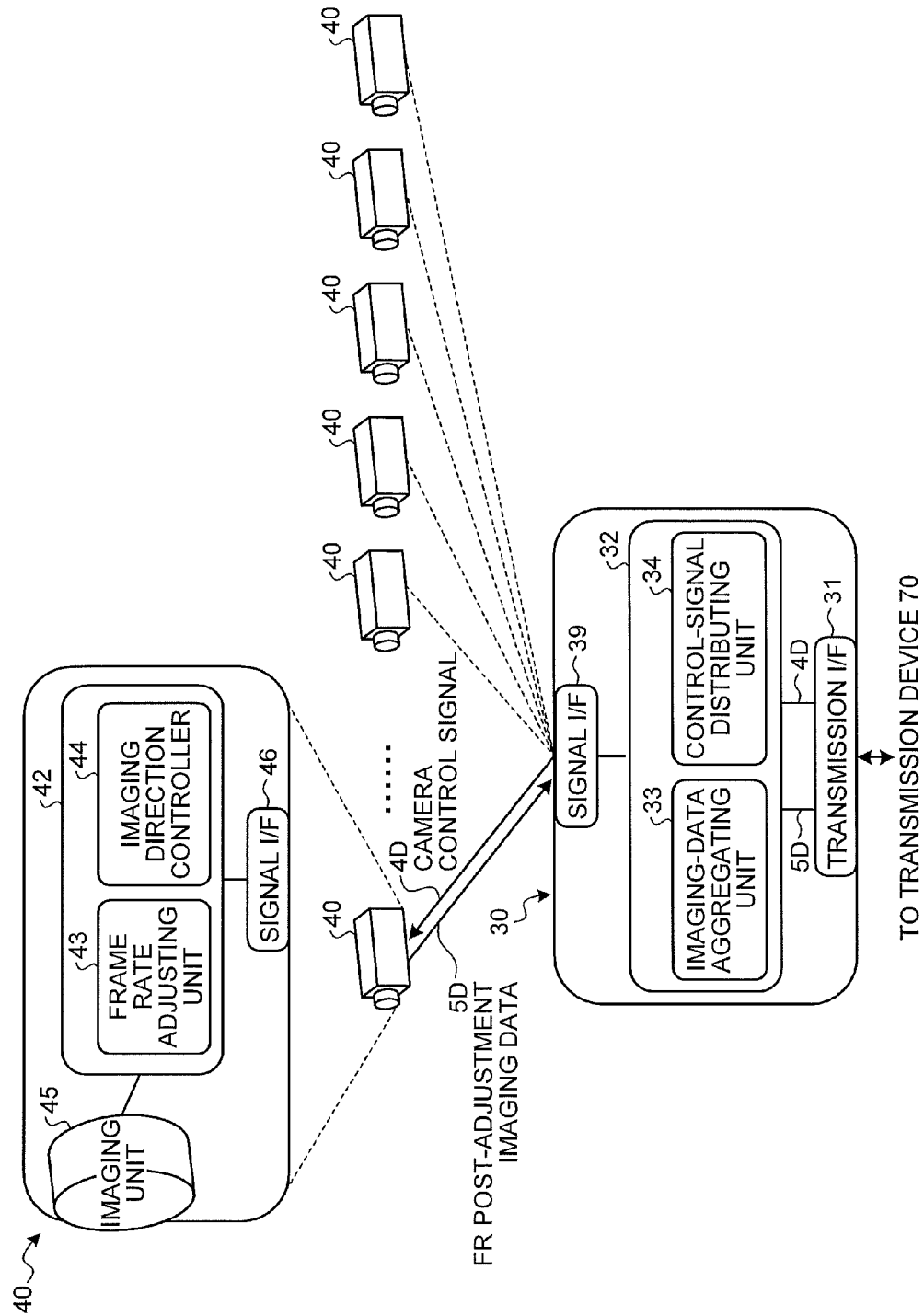
FIG. 4 is a block diagram of a configuration example of a camera-control terminal device and of a camera according to a second embodiment.

FIG. 4 is a block diagram of a configuration example of the camera-control terminal device and of a camera according to the second embodiment. The terminal device 30 shown in FIG. 4 is configured to include the transmission I/F 31, the signal collecting/delivering unit 32, and the signal I/F 39 as primary components thereof.

The signal collecting/delivering unit 32 is configured to include the imaging-data aggregating unit 33 and the control-signal distributing unit 34. Functions of the imaging-data aggregating unit 33 and the control-signal distributing unit 34 are identical to those of the imaging-data aggregating unit 33 and the control-signal distributing unit 34 according to the first embodiment and thus descriptions thereof will be omitted.

The camera 40 shown in FIG. 4 is configured to include a controller 42, an imaging unit 45, and a signal I/F 46 as primary components thereof. The controller 42 includes an adjusting unit 43 and a direction controller 44, and has a configuration identical to that of the controller 35 according to the first embodiment. That is, it is a configuration in which the controller 35 included in the terminal device 30 according to the first embodiment is incorporated in the camera 40.

In the first embodiment, signals sent and received by the terminal device 30 and the camera 40 are the imaging-direction control signal 6D and the FR pre-adjustment imaging data 3D, whereas in the present embodiment, the signals are the camera control signal 4D and the FR post-adjustment imaging data 5D. Although not show, the imaging-direction control signal 6D and the FR pre-adjustment imaging data 3D are sent and received between the imaging unit 45 and the controller 42. The controller 42 can be also included in plural cameras, in which case FR adjustment and control of the imaging direction can be performed on, each of the cameras 40 independently.

As described above, because the in-train monitor system 10 according to the second embodiment simplifies the configuration of the terminal device 30, the terminal device 30 according to the second embodiment can connect more cameras 40 than the terminal device 30 according to the first embodiment. Moreover, because it is not necessary to replace the terminal device 30 when a failure has occurred in the controller 42 of the camera 40, maintenance cost and the like for the in-train monitor system 10 can be reduced and monitoring can be continued with another camera 40.

INDUSTRIAL APPLICABILITY

As described above, the in-train monitor system according to the present invention, which displays imaging data sent from plural cameras on a predetermined display device and records the data in a recording medium incorporated on a train, is useful as an in-train monitor system intended for crime prevention and the like.

EXPLANATIONS OF LETTERS OR NUMERALS

1D Monitoring-target condition information
3D FR pre-adjustment imaging data
4D Camera control signal
5D FR post-adjustment imaging data
6D Imaging-direction control signal
10 In-train monitor system
20 Camera-control central device
21, 27, 31 Transmission I/F
22 Display device I/F
23 Signal processor
24 Imaging-data output unit
25 Camera-control-signal generating unit
26 Monitoring-target condition-information monitoring unit
30 Camera-control terminal device
32 Signal collecting/delivering unit
33 Imaging-data aggregating unit
34 Control-signal distributing unit
35, 42 Camera controller
36, 43 Frame rate adjusting unit
37, 44 Imaging direction controller
38 Camera I/F
39, 41, 46 Signal I/F
40 Camera
45 Imaging unit
50 Camera control table
51 Car number
52 Monitoring target
53 Camera number
54 Imaging angle
55 Frame rate
56 Display (on/off)
60 Recording unit
70 Transmission device
71, 101 Inter-car transmission channel
72, 103 Intra-car-formation transmission channel
80 Driving-cab display device
81 Conductor-compartment display device
100 Information-control central device 102 Display-device transmission channel
110 Information-control terminal device
120 Condition-monitoring target device

The invention claimed is:

1. An in-train monitor system comprising:
an information management system that manages monitoring-target condition information output from sensors included respectively in various devices incorporated in a train;
cameras that are incorporated in respective train cars and take images of the devices incorporated in the train;
a transmission device that is connected to an in-train transmission channel of each train car and relays imaging data from the camera to each train car,
a camera-control central device that is connected to the information management system and the transmission device, monitors the monitoring-target condition information sent from the information management system, determines whether the devices incorporated in the train are in a normal condition, and generates a frame-rate control signal for adjusting a frame rate of imaging data from the camera; and
a camera-control terminal device that is connected to the transmission device and the camera and adjusts a frame rate of imaging data from the camera based on the frame-rate control signal; wherein
the camera-control central device includes a correspondence relation between the devices and the cameras that take images of the respective devices, and wherein
when any of the devices incorporated in the train indicates an abnormal condition, the camera-control central device generates an imaging-direction control signal for adjusting an imaging direction for a camera corresponding to the device indicating the abnormal condition, and
the camera-control terminal device sends the imaging-direction control signal to the camera.

2. The in-train monitor system according to claim 1, wherein
when any of the devices incorporated in the train indicates an abnormal condition, the camera-control central device generates the frame-rate control signal for each of the devices incorporated in the train or for each of the cameras, and
the camera-control terminal device adjusts a frame rate of imaging data from the camera for each of the devices incorporated in the train or for each of the cameras based on the frame-rate control signal.

3. The in-train monitor system according to claim 1, wherein each of the cameras comprises:
a frame-rate adjusting unit that adjusts a frame rate of imaging data from the camera based on the frame-rate control signal; and
an imaging direction controller that adjusts an imaging direction based on the imaging-direction control signal.

4. An in-train monitor method for a train having an information management system that manages monitoring-target condition information output from sensors included respectively in various devices incorporated in a train, cameras that are incorporated in respective train cars and take images of the devices incorporated in the train, and a transmission device that is connected to an in-train transmission channel of each train car and relays imaging data from the camera to each train car, the method being used for monitoring the devices incorporated in the train or for monitoring passengers and the method comprising:
monitoring the monitoring-target condition information sent from the information management system to determine whether the devices incorporated in the train are in a normal condition;
generating a frame-rate control signal for adjusting a frame rate of imaging data from the camera; and
adjusting a frame rate of imaging data from the camera based on the frame-rate control signal; wherein
when any of the devices incorporated in the train indicates an abnormal condition, the generating generates an imaging-direction control signal for adjusting an imaging direction for a camera corresponding to the device indicating the abnormal condition based on a correspondence relation between the devices and the cameras that take images of the respective devices, and
the adjusting sends the imaging-direction control signal to the camera.

5. The in-train monitor method according to claim 4, wherein
when any of the devices incorporated in the train indicates an abnormal condition, the generating generates the frame-rate control signal for each of the devices incorporated in the train or for each of the cameras, and
the adjusting adjusts a frame rate of imaging data from the camera for each of the devices incorporated in the train or for each of the cameras based on the frame-rate control signal.

6. The in-train monitor method according to claim 4, wherein each of the cameras performs:
adjusting a frame rate of imaging data based on the frame-rate control signal; and
adjusting an imaging direction based on the imaging-direction control signal.

7. The in-train monitor system according to claim 1, wherein
the devices are incorporated in train cars and each of the devices is one of a door, an automatic vending machine, an in-car thermometer, and a load compensating unit.

8. The in-train monitor method according to claim 4, wherein
the devices are incorporated in train cars and each of the devices is one of a door, an automatic vending machine, an in-car thermometer, and a load compensating unit.

* * * * *